Sept. 26, 1967 A. D. COGGESHALL ETAL 3,344,296
ADJUSTABLE RETAINING STRAP FOR DYNAMOELECTRIC MACHINE WINDING
Filed June 29, 1962 2 Sheets-Sheet 1
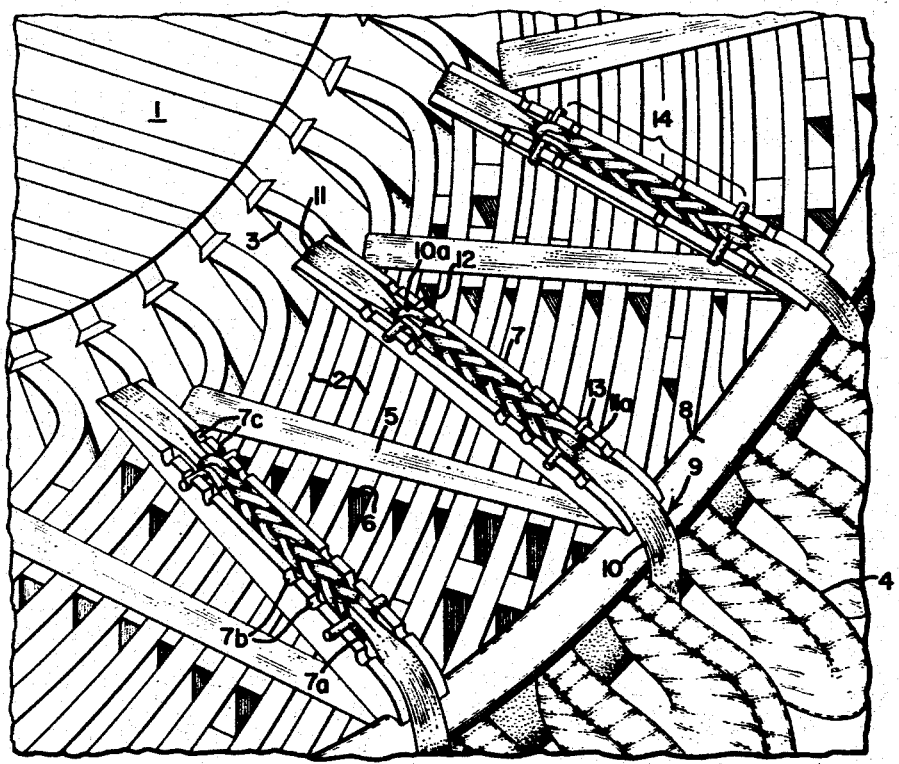
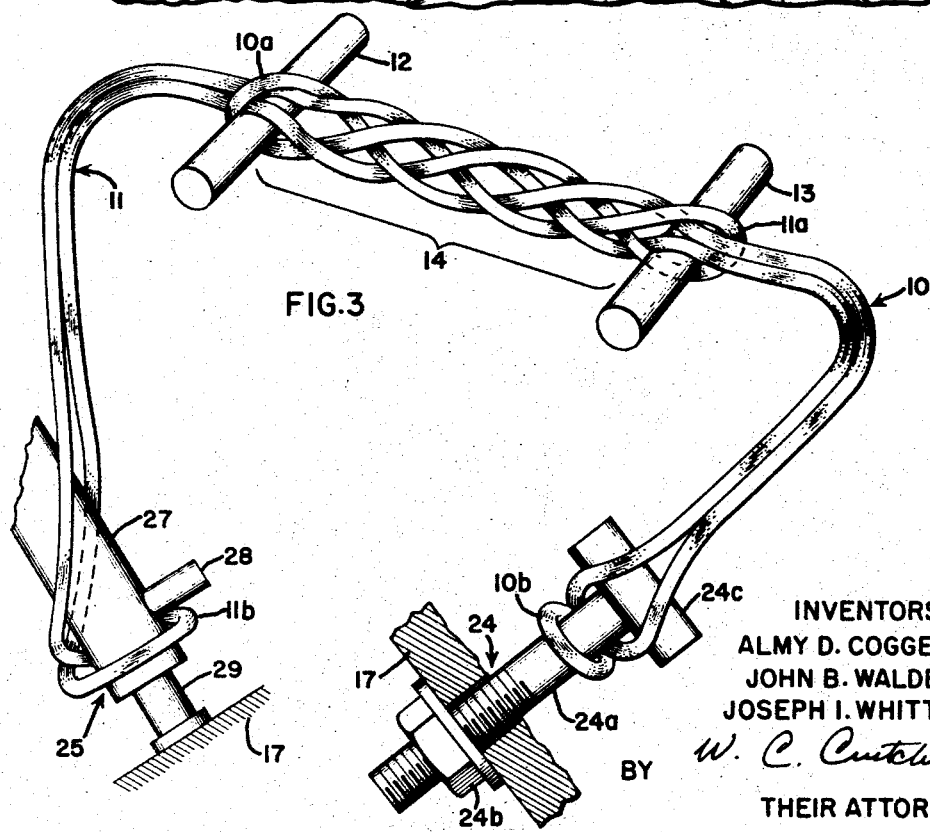
INVENTORS:
ALMY D. COGGESHALL,
JOHN B. WALDBILLIG,
JOSEPH I. WHITTLESEY,
BY W. C. Crutchy
THEIR ATTORNEY.

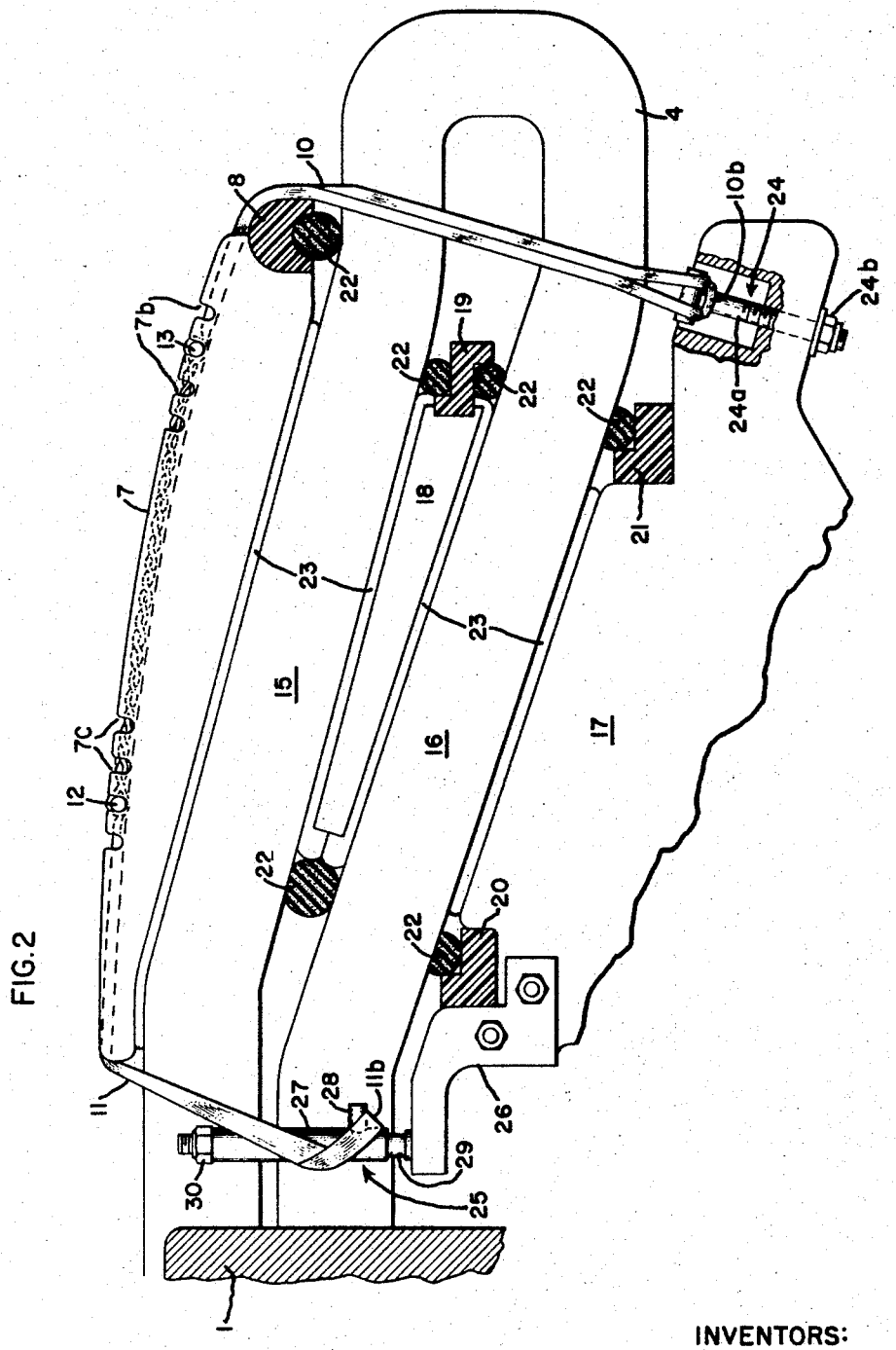

United States Patent Office 3,344,296
Patented Sept. 26, 1967

3,344,296
ADJUSTABLE RETAINING STRAP FOR DYNAMO-
ELECTRIC MACHINE WINDING
Almy D. Coggeshall, Schenectady, John B. Waldbillig, Albany, and Joseph I. Whittlesey, Schenectady, N.Y., assignors to General Electric Company, a corporation of New York
Filed June 29, 1962, Ser. No. 206,253
7 Claims. (Cl. 310—260)

This invention relates to an adjustable retaining device for holding electrical conductors in position. More particularly, it relates to an improved insulating adjustable tension strap which, when used in conjunction with other support members, serves to hold the end windings of a dynamoelectric machine in place.

The end windings of a large dynamoelectric machine must be held securely in place against the electromagnetic forces tending to dislodge them. Traditionally, the end windings have usually been individually lashed to the generator support structure by means such as resin impregnated cord. An improved arrangement for retaining the end windings of a dynamoelectric machine is disclosed in United States Patent 3,089,048 issued May 7, 1963 in the names of J. J. Bahn, A. D. Coggeshall, R. T. Maher, and J. B. Waldbillig and assigned to the assignee of the present application. In that improved arrangement, the end windings are held between inner and outer support members by two spaced tension members clamping the support members together about the end turns. Either the inner or outer support members may then be held by the stator framework.

The use of two separate tension members in the aforementioned patent requires considerable space and also requires that the support members each have provision for anchoring one end of a tension member. Accordingly, a single tension member, preferably secured to only one of the support members, would achieve considerable saving in space.

The method of manufacturing stator bars for such large machines involves preforming the end turns on a complex curve. It is inevitable that slight manufacturing variations cause differences in spacing, both radially and axially, between bars. Also large generators are made to order for a particular application and hence the size and shape of the end turns vary considerably. Therefore, suitable retaining straps must either be made adjustable or else a number of straps of different sizes must be provided. In the interest of economy, it is desirable that a single strap be employed which provides a substantial or "coarse" adjustment in length. A suitable retaining strap must also provide a "fine" adjustment in order to equally distribute the load among several straps and in order to obtain sufficient leverage to properly load the straps.

Accordingly, one object of the present invention is to provide an improved retaining strap for holding a group of insulated conductor bars in place.

Another object is to provide an improved retaining strap which is adjustable in length and which may be used in conjunction with inner and outer support members to retain the end windings of a large generator in place.

A still more specific object of the present invention is to provide an improved insulating retaining strap which has both a "coarse" adjustment for length, and a "fine" adjustment which serves to load the strap.

The subject matter which is regarded as the invention is particularly pointed out and distinctly claimed in the concluding portion of the specification. The invention, however, both as to organization and method of practice, together with further objects and advantages thereof, may best be understood by reference to the following description taken in connection with the accompanying drawing in which:

FIG. 1 is a perspective view of a portion of the stator end winding support system of a large generator;

FIG. 2 is a horizontal cross-section through the end winding support system, illustrating one of the retaining straps and associated structure in more detail; and FIG. 3 is a schematic perspective drawing, partly in section, showing the adjustable retaining strap and its anchor members, but omitting the other structure for clarity.

Generally stated, the invention is practiced by providing a pair of fiber-glass loops impregnated with curable resin which are interwoven along a portion of their lengths to provide a "coarse" length adjustment, and which are fitted with suitable adjustable anchor members at the free ends thereof, to provide a "fine" adjustment. Means are provided to hold the interwoven portion at a fixed length while the resin cures.

Referring now to FIG. 1 of the drawing, a stator core 1 is shown with a number of conductor bars 2 emerging from slots 3 and bending both circumferentially and radially to form the end turns of the generator stator winding. The circumferentially extending conductor bars 2 are electrically connected at "series loops" 4 to form complete coils.

The conductor bars 2 are securely held transversely spaced from one another by means of a tension strap 5 and by insulating spacer blocks 6. Tension strap 5 may be made up of glass fiber loops as disclosed in copending application Ser. No. 86,494, now Patent 3,135,888, filed in the name of A. D. Coggeshall on Feb. 1, 1961. The spacer blocks 6 may either be of the "conforming" or of the "nonconforming" type. A suitable conforming block which may be used is more fully described in U.S. Patent 2,980,-757 issued to A. D. Coggeshall and H. R. Shirk on Apr. 18, 1961. Both the aforementioned pending application and patent are assigned to the assignee of the present application. The strap 5 and spacer blocks 6 serve to hold the conductor bars 2 transversely spaced relative to one another and form no part of the support system of the present invention, which secures the entire group of conductor bars to a support structure.

Disposed on top of the conductor bars 2 and extending axially and diverging slightly in a radial direction are inner support members 7. These are spaced circumferentially about the end of the stator core and at one end they contact a rigid circumferential ring 8 disposed near the front of the machine. Each of the inner support members 7 has a contoured, axially extending groove 7a and also includes a group of tranverse front notches 7b and a similar group of transverse rear notches 7c.

The tension strap, which is the subject of the present invention and which is shown generally at 9, includes a front loop 10 which terminates in a bight 10a toward the stator core 1 and a similar rear loop 11 which terminates in a bight 11a near the front of the machine. A dowel 12 passes through the bight 10a of the front loop and rests in one of the rear notches 7c. A similar dowel 13 passes through bight 11a and rests in one of the front transverse notches 7b. Between dowels 12, 13, the sides of loops 10, 11 are loosely interwoven, as indicated by the bracket 14, in a manner later to be described.

The manner by which the other ends of loops 10, 11 are held will be made more clear by reference to the horizontal view in FIG. 2 of the drawing. There the top armature bars 15 and bottom armature bars 16 are seen to emerge from stator core 1 and are connected at "series loop" 4, it being understood that top and bottom bars 15, 16 are actually skewed with respect to the generator axis but are shown in the same plane here for clarity. The inner support member 7 is seen with the notches 7b, 7c;

the dowels 12, 13 are seen to hold the bights of front and rear loops 10, 11 respectively.

Radially aligned with the inner support member 7 is a more massive outer support member 17 which is supported by the stator framework. Outer support member 17 is preferably supported by means of a special mounting bracket (not shown) so that outer support member 17 will slide axially with respect to stator core 1 in a manner more fully described in the aforementioned U.S. Patent 3,089,048, although this is not necessary for the purpose of the present invention. Since the top and bottom bars 15, 16 diverge radially from one another slightly, a tapered spacer member 18 is disposed between top and bottom bars and aligned with inner and outer support members 7, 17. A series of rigid circumferential rings 19, 20, 21, similar to the aforementioned ring 8, are received in suitable grooves of the respective support members. Rings 8, 19, 20 and 21 may be of glass fiber impregnated with cured polyester resin.

A system of "conforming" curable plastic pads is used to separate rigid members from the armature bars. These comprise various circumferentially-extending pads 22 and axially extending pads 23, fitted in suitable grooves in the rigid members. The exact arrangement of these conforming curable pads is not material to the present invention, but they may be glass fibers impregnated with soft or uncured resin, which is arranged to harden to a rigid mass either upon the application of a catalyst or heat. Hence, after securing the stator end turns in place and applying tension between support members, the entire stator can be baked to cure the conforming pads to a hard, rigid mass so that they exactly fit the irregularities in the various members.

The lower bights 10b, 11b of the front and rear straps 10, 11 are held in place by suitable anchor member 24, 25 respectively. The details of anchor members 24, 25 may vary considerably, but they should be of the type which provides a transverse extension or rod over which the bights of the fiberglass loops can be retained, so that the loop may be continuous rather than requiring clamping of the glass fibers, which might cause abrasion or slippage.

The anchor member 24 comprises a T-bolt whose shank 24a passes through a hole in the outer support member 17 and is threaded to receive a nut 24b. It will be apparent that nut 24b can be tightened to increase the tension on front loop 10 against the dowel 12 without the head of the T turning to twist or entangle the glass fiber loop.

The other anchor member 25 is attached to the outer support member 17 by means of an L-shaped bracket 26. The anchor member includes a cylinder 27 having a protruding rod 28. Cylinder 27 slides freely over a stud 29 which is threaded at the end to receive a nut 30. By tightening nut 30, the cylinder 27 is forced downward without turning so as to tension loop 11 against dowel 13. As will later be apparent from the description, one of the anchor members may be fixed, i.e., non-adjustable, with the other anchor member providing the total adjustment.

Referring to FIG. 3 of the drawing, a preferred manner of arranging loops 10 and 11 is more clearly illustrated. Loops 10, 11 each comprise a continuous loop of glass fiber strands which is preferably impregnated with thermosetting resin. Each loop comprises a number of turns of strands which, in turn, comprise a very large number of tiny glass monofilaments. A typical loop might therefore consist of 12,000 such monofilaments making up a cross sectional area of 0.2 square inch. A suitable thermosetting resin might be any one of well-known laminating resins, such as the polyester, epoxy, or phenolic types combined with a suitable catalyst for hardening or curing.

As seen in FIG. 3, the lower bight 10b of the front loop 10 encircles the shank 24a of the T-bolt 24 and is held by the cross-piece 24c of the T-bolt. Similarly, the lower bight 11b of the rear loop 11 is twined around the cylinder 27 and kept from becoming dislodged by means of the protruding rod 28.

To form the braided portion 14, one of the loops is intertwined with the other by alternately passing the free end of one loop through an eyelet formed by the other loop and then giving it a half-twist to form an eyelet of its own, through which the end of the second loop is then passed and given a half-twist, etc. It must be emphasized that the braided portion 14 is very loosely woven as illustrated by FIG. 3 so that considerable longitudinal slippage can take place either by pulling bights, 10a, 11a simultaneously or by pulling bights 10b, 11b simultaneously. The dowels 12, 13 are then passed through the bights 10a, 11a, the dowels being either of wood or fiber glass. Preferably the dowels are beneath the sides of the loop as shown, so that the loops hold the dowels down in their respective notches.

The assembly and operation of the retaining strap will be apparent from the following description. As assembly starts, the bars 2 are in place on top of the outer support members 17. The loops 10, 11 are first interwoven as shown in FIG. 3 and then the bight 11b is secured over the anchor member 25. Next the inner support member 7 is laid on top of the conductor bars and the interwoven portion 14 of the loops 10, 11 is laid in the contoured groove 7a. A trial inspection is made to indicate the position of the T-bolt 24 with respect to its receiving hole. Then a coarse adjustment of the length of the strap is made by either pulling on the T-bolt 24 to lengthen the strap or on the opposite dowels 12, 13 to shorten the strap. When the approximate length has been achieved so that the T-bolt shank 24a will just go through the hole to receive nut 24b, dowels 12, 13 are placed in the appropriate transverse slots 7c, 7b respectively. Then the nut 24b is attached and a preliminary tensioning of loop 10 is made by tightening nut 24b. Similarly, loop 11 may be tensioned by tightening nut 30 (FIG. 2). The foregoing procedure is carried out for each of the tension straps around the generator periphery to apply the proper tension and to distribute the tension between straps.

The dowels 12, 13 in the notches 7c, 7b, respectively serve to hold bights 10a, 11a spaced from one another to prevent shortening the interwoven portion 14. In the event that tension is unequal on loops 10, 11, the inner support member 7 will move somewhat to distribute the load between loops.

Next the thermosetting resin impregnating the fiber glass straps 10, 11 is cured by baking the complete generator stator in an oven. At this time, the braided portion 14 forms its own lock to prevent further slippage of the straps with respect to one another. The resin causes the fiber glass straps to blend together and form a powerful clamp against further elongation of the interwoven portion. In actuality, dowels 12, 13 might now be removed since they no longer serve a holding function; the separate loops have blended into a single retaining strap 9. Further tightening of straps 9 can be accomplished by tightening either T-bolt 24 or sleeve 27. Although dowels 12, 13 no longer provide the primary holding, they are usually left in place rather than going through the difficulty of removing them.

To illustrate the holding power of the braided portion 14, when the resin has cured, we have found that straps made in accordance with the aforementioned procedure have been tested and found to eventually break in the unbraided portions rather than to slip or otherwise to break in the braided portions.

Thus it will be apparent that the improved retaining strap provides both a "coarse" adjustment by means of the braided portion 14, acting in conjunction with the dowels 10, 11, and also a "fine" adjustment comprising the adjustable anchor members 24, 25, which are used to tension the loops prior to curing. One or both of the anchor members may later be used to apply additional tension after the interwoven portion 14 has cured.

It is to be understood that there undoubtedly are other suitable structures for anchor members which will provide the same function as the ones illustrated, and that there are other means for holding the interwoven bights of the fiber glass loops while the resin in the braided portion cures. For example, a spacing block might be employed to hold the bights 10a, 11a spaced from one another while the resin cures. In this case, only one of the anchor members need be adjustable. The other free bight, either 10b or 11b, can be placed around a suitable fixed pin on either end of outer support member 17.

This adjustable retaining strap is electrically insulating and is suitable for a wide variety of shapes and sizes of end turns. The use of a single tension strap (comprised of two interwoven cured loops) in the manner shown removes obstructions from the inside of the stator end turns which might interfere with the insertion of the generator rotor or which might weaken the inner support members.

While there has been described what is at present considered to be the preferred embodiment of the invention, it will be understood that various modifications may be made therein, and it is intended to cover in the appended claims all such modifications as fall within the true spirit and scope of the invention.

What is claimed as new and is desired to be secured by Letters Patent of the United States is:

1. An adjustable length retaining strap comprising:
   first and second continuous multi-strand loops each having a pair of end bight portions, one of the end bight portions of said first loop interwoven with one of the end bight portions of said second loop to provide adjustment in the combined length of said loops, movable members embraced by said first end bights at least the interwoven portion of said loops being impregnated with cured resin, whereby said overlapping interwoven portions lock the first and second loops together, said first and second loops extending in opposite directions,
   from said interwoven portions toward first and second anchor means, each of said anchor means holding an unwoven end bight portion of one of said loops, at least one of said anchor means being constructed and arranged to exert an adjustable tensioning force on the unwoven end bight portion of one loop.

2. An insulating retaining strap assembly comprising:
   first and second multi-strand glass fiber loops each having first and second end bight portions, the first end bight portion of each of said loops being arranged in overlapping relationship and loosely interwoven to provide adjustment in the combined length of said loops, movable members embraced by said first end bight portions at least the interwoven portion of said loops being impregnated with curable resin, whereby said overlapping interwoven portion will lock the first and second loops together when the resin is cured, said first and second loops extending in opposite directions from said interwoven portions,
   support means constructed and arranged to hold said interwoven portions at a fixed length to prevent shortening thereof as tension is applied, and
   first and second anchor means holding the respective second unwoven end bight portions of the loops, at least one of said anchor means being constructed and arranged to exert an adjustable tensioning force on the unwoven end bight portion of one of the loops.

3. An insulating retaining strap assembly comprising:
   first and second continuous multi-strand glass fiber loops each having first and second end bight portions, the first of said end bight portions being arranged in overlapping contiguous relationship and loosely interwoven to provide adjustment in the combined length of said loops, movable members embraced by said first end bight portions, said loops being impregnated with curable resin, whereby said overlapping interwoven portion will lock the first and second loops together when the resin is cured, said first and second loops extending in opposite directions from said interwoven portions,
   a support member defining a contoured recess for receiving at least the overlapping interwoven portion of said loops, said support member including means holding said movable members at a fixed distance to prevent shortening of said interwoven portion when tension is applied to the loops, and
   first and second anchor means holding the respective second unwoven end bight portions of the loops, at least one of said anchor means being constructed and arranged to exert an adjustable tensioning force on the unwoven end bight portion of one of the loops.

4. The combination of:
   an array of spaced electrical conductors, including at least one group of substantially parallel conductors,
   first and second spaced substantially parallel support members on opposite sides of said array, each of said support members extending across a plurality of conductors,
   first and second continuous multi-strand loops each having first and second end bight portions, said loops being arranged in overlapping relationship and having first contiguous end bight portions loosely interwoven to provide adjustment in the combined length of said loops, movable members embraced by said first end bight portions at least said overlapping portion being disposed in a longitudinal contoured recess defined by the first support member with the second unwoven ends of said loops extending in opposite direction toward the second support member, said interwoven loop portions being impregnated with cured resin, whereby said overlapping interwoven portion locks the first and second loops together, and
   first and second anchor means disposed on said second support member and holding the second unwoven end bight portions of the respective loops, at least one of said anchor means being constructed and arranged to move relative to said second support member so as to exert an adjustable tensioning force on said loops.

5. The combination according to claim 4 wherein said first support member includes means retaining the first interwoven end bight portions of said first and second loops at a fixed length in said recess so that the second unwoven ends of the loops may be held under tension while the resin cures by anchoring said movable members, to lock the interwoven portion of the loops together.

6. A dynamoelectric machine stator end winding support system comprising:
   first and second groups of substantially parallel insulated conductor bars,
   a first support member disposed adjacent said first group and crossing a plurality of conductor bars,
   a second support member disposed adjacent said second group and crossing a plurality of conductor bars and radially aligned with said first support member, said second support member defining a contoured groove along its length and also defining transverse notches crossing said groove,
   first and second continuous multi-strand glass fiber loops each having first and second end bight portions, said loops being arranged with the first end bight portions in overlapping contiguous relationship and loosely interwoven to provide longitudinal adjustments of the combined length of said loops, said interwoven portions being disposed in the contoured groove of said second support member, the interwoven first end portions of said loops being impregnated with curable resin, whereby the overlapping interwoven portions will lock the first and second loops together when the resin is cured,
   first and second anchor means disposed on the first support member opposite the ends of the second support member, said anchor means including projecting portions holding the respective second unwoven end bight portions of the interwoven loops, at least one of said anchor means being constructed and arranged to exert an adjustable tensioning force on said loops, and first and second dowel means extending through the end loops of the first interwoven end bight portions of the first and second loops respectively and disposed in said transverse notches to hold the interwoven bight portions at a preselected length while the resin cures.

7. An adjustable length retaining strap comprising:
(a) a continuous loop with first and second end bight portions, said first end bight portion passing over a movable member and said second end bight portion adjustably anchored to a fixed point,
(b) a duplicate continuous loop with first and second end bight portions, said first end bight portion of said duplicate loop passing over a duplicate movable member and said second end bight portion of said duplicate loop anchored to a separate fixed point,
(c) said movable member located intermediate said duplicate movable member and said separate fixed point,
(d) said duplicate movable member located intermediate said movable member and said fixed point,
(e) said loops interwoven in the common region between said movable members, at least the interwoven portion of said loops being impregnated with curable resin,
(f) and means to anchor said movable members.

References Cited

UNITED STATES PATENTS

| | | | |
|---|---|---|---|
| 2,412,895 | 12/1946 | Lewes | 24—122.6 X |
| 2,450,355 | 9/1948 | Robbins | 87—8 |
| 2,774,900 | 12/1956 | Acton et al. | 310—270 |
| 2,753,751 | 7/1956 | Penta | 87—8 |
| 3,024,302 | 3/1962 | Coggeshall | 174—177 |
| 3,110,908 | 11/1963 | Newgard | 87—8 X |

FOREIGN PATENTS 267,355  9/1929  Italy.

MILTON O. HIRSHFIELD, *Primary Examiner.*

J. W. GIBBS, J. J. SWARTZ, *Assistant Examiners.*